United States Patent
Hammes et al.

(10) Patent No.: US 7,483,507 B2
(45) Date of Patent: Jan. 27, 2009

(54) METHOD FOR RESYNCHRONIZATION OF A MOBILE RADIO RECEIVER IN THE EVENT OF A CHANGEOVER BETWEEN TWO DIFFERENT MODULATION METHODS

(75) Inventors: Markus Hammes, Dinslaken (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 734 days.

(21) Appl. No.: 10/926,716

(22) Filed: Aug. 26, 2004

(65) Prior Publication Data

US 2005/0117678 A1    Jun. 2, 2005

(30) Foreign Application Priority Data

Aug. 29, 2003    (DE)    ............................ 103 39 886

(51) Int. Cl.
*H04L 7/00* (2006.01)

(52) U.S. Cl. .................. 375/366; 375/365; 375/362; 375/342; 370/349; 370/465; 370/509; 370/512

(58) Field of Classification Search .............. 375/342, 375/340, 362, 364, 365, 366, 368, 295; 370/349, 370/465, 509, 512

See application file for complete search history.

(56) References Cited

U.S. PATENT DOCUMENTS

| 5,706,428 | A | * | 1/1998 | Boer et al. | .................. 370/342 |
| 6,393,064 | B1 | | 5/2002 | Nagai et al. | .................. 375/259 |
| 6,859,466 | B1 | * | 2/2005 | Chen et al. | .................. 370/509 |
| 2002/0035505 | A1 | * | 3/2002 | Ho et al. | ........................ 705/13 |
| 2002/0146085 | A1 | | 10/2002 | Morris | ........................ 375/365 |
| 2003/0036397 | A1 | | 2/2003 | Takahashi | .................... 455/502 |
| 2004/0165576 | A1 | * | 8/2004 | Reunamaki | ................. 370/350 |
| 2004/0218683 | A1 | * | 11/2004 | Batra et al. | ................. 375/261 |
| 2004/0240377 | A1 | * | 12/2004 | Palin et al. | .................. 370/204 |

FOREIGN PATENT DOCUMENTS

| DE | 100 26 325 A1 | 12/2001 |
| EP | 0 774 850 A2 | 11/1996 |

\* cited by examiner

*Primary Examiner*—Phuong Phu
(74) *Attorney, Agent, or Firm*—Dicke, Billig & Czaja, PLLC

(57) ABSTRACT

When data bursts are transmitted between a base station and a mobile receiver, a changeover is made between a plurality of modulation methods during an existing radio link for modulation of the data. For resynchronization of the receiver in the event of the changeover, synchronization information items are determined from a first part (ET) of the data burst modulated by a first modulation method, and are used for synchronization with a second part (ZT) of the data burst modulated by the second modulation method.

16 Claims, 3 Drawing Sheets

METHOD FOR RESYNCHRONIZATION OF A MOBILE RADIO RECEIVER IN THE EVENT OF A CHANGEOVER BETWEEN TWO DIFFERENT MODULATION METHODS

PRIORITY

This application claims priority to German application no. 103 39 886.4 filed Aug. 29, 2003.

TECHNICAL FIELD OF THE INVENTION

The invention relates to a method in which data bursts are transmitted via radio between a base station and at least one mobile radio receiver or a mobile station and in which resynchronization of the mobile radio receiver is carried out in the event of a changeover between two different modulation methods.

BACKGROUND OF THE INVENTION

Data transmission systems are used in diverse forms, for example data packets are intended to be interchanged via radio over short distances. Such a data transmission over short distances is provided inter alia in the event of data interchange between the base part and the mobile part of a cordless telephone or between a computer and peripherals. Such data transmission systems in which data are interchanged in wire-free fashion over short distances of just a few meters between a base station and mobile stations are referred to as piconetwork. Piconetworks can be operated according to different standards, such as, for example, the Bluetooth or DECT standard (Digital European Cordless Telecommunications).

Time slot methods are usually used for the data transmission. In time slot methods, downlinks (data transmission from the base station to the mobile station) and uplinks (data transmission from the mobile station to the base station) are allocated time slots with a specific temporal length. Time slot methods that are frequently used are the TDMA method (Time Division Multiple Access) as a multiple access method and also the TDD method (Time Division Duplex) as a duplex method for the formation of a bidirectional channel between the base station and the mobile stations.

In order to ensure a narrowband transmission range within a frequency channel, a two-valued GFSK modulation method (Gaussian Frequency Shift Keying) is used for example in digital cordless communication systems based e.g. on the Bluetooth standard. The GFSK modulation method uses a Gaussian filter for limiting the frequency bandwidth, thereby suppressing crosstalk between the individual frequency channels.

At the present time, in digital cordless communication systems based for example on the Bluetooth standard, data are transmitted at rates of 1 Mbit/s as standard with application of frequency hopping methods. One possibility for achieving higher data transmission rates is to use higher-valued modulation methods, such as, for example, the $\pi/4$-DQPSK (Differential Quadratur Phase Shift Keying), $\pi/8$-DQPSK or M-FSK method (Frequency Shift Keying), in which an M-valued symbol where $M=2^m$ is transmitted instead of a (two-valued) bit.

In many mobile radio systems, it is possible to change over between two modulation methods, for example GFSK and DQPSK, within an existing radio link in order thus to obtain a higher data transmission rate. In the case of a mobile radio system that uses the TDMA time slot method, for example, for data transmission, such a changeover between the modulation methods may be effected within a burst. In addition to a higher data transmission rate, it is also possible in this way to ensure a desirable downwards compatibility with modulation methods used in earlier versions of a communications standard.

In the case of such mobile radio systems, it may be provided that a first modulation method is used for setting up a connection between a base station and a mobile station. A transmission burst comprises a first data burst header or data packet (header), which is transmitted by the first modulation method and indicates to the respective remote station with which a radio link is set up that a changeover is to be made to a second modulation method. However, a changeover is effected only when the remote station also supports this second modulation method. Such control of the changeover between the modulation methods may also be performed at higher protocol levels. In the event of the receiver being changed over to the second modulation method a few components, such as reception filters for example, are generally changed over, as a result of which changeover effects, such as propagation time changes in the signals, for example, may occur in the reception signal path. On account of the group delay times dependent on the filter properties, it is therefore necessary to carry out a renewed symbol synchronization with the data transmitted by the second modulation method. This further symbol synchronization is carried out with the aid of a second data burst header that is contained in the transmission burst and is transmitted by the second modulation method. This renewed synchronization process generally requires an additional synchronization unit in the respective receiver, as a result of which the outlay on components is relatively high.

Generally, a symbol synchronization comprises the two phases of acquisition and tracking. Depending on the burst structure, in particular on the length of the synchronization word (sync word) or access code in the data burst header, the acquisition has to be effected relatively rapidly. This can generally be realized only with a relatively high technical outlay. A second synchronization process within a burst is therefore problematic both with regard to the loss of time and with regard to the hardware outlay required therefor.

SUMMARY OF THE INVENTION

Therefore, it is an object of the invention to provide a method in which the resynchronization of the mobile receiver which becomes necessary during a radio transmission by virtue of the changeover between modulation methods can be carried out rapidly and with little outlay.

This object can be achieved by means of a method for resynchronization of a mobile radio receiver in the event of a changeover between two different modulation methods by which data of a data burst transmitted from a base station to the mobile radio receiver are modulated, comprising the steps of determining synchronization information items from a first part of the data burst modulated by a first modulation method and synchronizing the mobile radio receiver with a second part of the data burst modulated by a second modulation method, using the synchronization information items determined.

The object can also be achieved by an arrangement for resynchronization of a mobile radio receiver in the event of a changeover between two different modulation methods by which data of a data burst transmitted from a base station to the mobile radio receiver are modulated, comprising means for determining synchronization information items from a first part of the data burst modulated by a first modulation method and means for synchronizing the mobile radio receiver with a second part of the data burst modulated by a second modulation method, using the synchronization information items determined.

In the case of a method according to the invention for resynchronization of a mobile radio receiver, a changeover is made between two different modulation methods by which data of a data burst transmitted from a base station to the mobile radio receiver are modulated. As an essential concept of the invention, synchronization information items are determined from a first part of the data burst modulated by a first modulation method, and a synchronization of the mobile radio receiver with a second part of the data burst modulated by a second modulation method is carried out using the synchronization information items. The modulation methods are generally changed over during an existing link between the base station and the mobile radio receiver and may be effected continuously during the time duration of a data burst.

The use of synchronization information determined during the first synchronization for the resynchronization means that a low-outlay and rapid reacquisition and/or compensation of changeover effects can be ensured in the event of a changeover of the modulation method within a data burst.

It may be provided that the first part of the data burst merely comprises the information items of a first access code or of a synchronization word. It may also be provided that the first part comprises a first data burst header in addition to the first access code. Furthermore, it may be provided that the second part of the data burst comprises at least the information items of a second data burst header and, if appropriate, additionally has a second access code. As a result, the first and second parts of the data burst may be designed in diverse ways, as a result of which it is possible to take account of adaptation to the respective transmission standard, for example Bluetooth.

The synchronization information items determined from the first part of the data burst are preferably symbol instants and/or an instant of a beginning of a data transmission frame. However, the synchronization information items that are used may also be further information items that characterize channel properties, such as, for example, information items of a frequency offset or channel parameters and also the path delay times in the event of multipath propagation.

In an advantageous manner, in the reception signal path of the mobile receiver, in the event of the changeover between the two modulation methods, a fixed temporal offset in particular a fixed phase relationship, occurs between the first and the second part of the data burst, and the information items of the temporal offset and the synchronization information items obtained during the synchronization with the first part of the data burst are used for synchronizing the second part of the data burst. As a result, the changeover effects, such as propagation time changes, for example, occurring in the event of the changeover of the reception path from the first to the second modulation method can be compensated for without necessitating a reacquisition of the signal.

The synchronization information items of the first part of the data burst, in particular the symbol instants determined and/or the initial instant of a data transmission frame, are preferably added to the fixedly prescribed temporal offset that is known in the receiver. This enables a particularly simple and low-outlay compensation of the changeover effects that occur. The synchronization of the receiver with the second part of the data bursts may be made possible in a simple manner by means of simple programming of the known temporal offset.

It may be provided that in the reception path of the mobile radio receiver, a fixed temporal offset, in particular a fixed phase relationship, is not provided in the event of the changeover between the two modulation methods between the first and second parts of the data burst. The synchronization information items determined from the first part of the data burst may then be used for initialization of a reacquisition phase for synchronization of the second part of the data burst. In an advantageous embodiment, in order to initialize the reacquisition phase for synchronizing the second part of the data burst, only a partial region of the data burst is taken into account, in particular a partial region without the first part of the data burst, from which, on the basis of the synchronization information determined during the first synchronization, it can be assumed that it comprises a second access code of the second part of the data burst.

As a result, it may be ensured that even when a fixed phase relationship is not provided in the event of the changeover between the two parts of the data burst transmitted by different modulation methods in the reception path, the acquisition phase of the synchronization of the second part of the data burst can be initialized at a favourable instant and the reacquisition can be carried out significantly more rapidly.

It may be provided that a GFSK modulation is carried out by the first modulation method and a DMPSK modulation, in particular a DQPSK modulation, is carried out by the second modulation method. The radio transmission of the data bursts may be carried out in accordance with the Bluetooth standard, for example.

BRIEF DESCRIPTION OF THE DRAWINGS

Exemplary embodiments of the invention are explained in more detail below with reference to schematic drawings, in which.

PREFERRED EMBODIMENTS OF THE INVENTION

Figure 1:
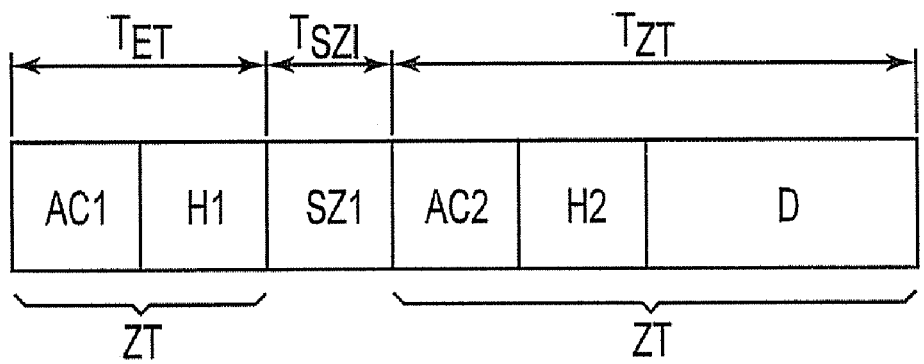
FIG. 1 shows a structure of a data burst.

FIG. 1 illustrates a structure of a data burst that can be interchanged by a radio in a data transmission system, for example a Bluetooth system, between a base station and at least one mobile station. The frequencies available for data transmission in piconetworks are defined by the ISM frequency bands (Industrial, Scientific and Medical). The ISM frequency bands are reserved for the radio-oriented and licenceless application of weak transmission power.

By way of example, in piconetworks, such data bursts or data packets are intended to be transmitted in the 2.4 GHz ISM frequency band. The competent regulatory authority, the Federal Communications Commission (FCC), has established FCC rules for the utilization of the ISM frequency bands which state, inter alia, that the transmission frequency within the frequency band must be varied after a specific time in accordance with a frequency hopping method. For this purpose, the frequency band is divided into frequency channels which do not overlap. The frequency in the centre of a frequency channel is referred to as the transmission frequency.

The data burst or the data packet in FIG. 1 comprises a first part ET having a synchronization word arranged at the start or a first access code AC1 and a subsequent first data burst header H1. A guard time interval SZI is (optionally) arranged following the first data burst header H1 of the first part ET. Furthermore, the data burst comprises a second part ZT following the guard time interval SZI. The second part ZT has a second synchronization word or a second access code AC2 and afterwards a second data burst header H2. This second data burst header H2 is followed by the useful data region D (Payload) of the second part ZT.

At the beginning of the transmission of the present data packet or data burst, during a time $T_{ET}$, the first part ET, which is modulated by a first modulation method, for example a GFSK modulation, is transmitted at a first data rate at a first transmission frequency by the base station and received by a mobile station. The first data rate is 1 Mbit/s, for example, as a standard symbol rate. According to the Bluetooth standard, at the beginning of the first part ET, identification information items are transmitted by means of the access code AC1 of the piconetwork, then followed by the first data burst header H1. The data burst header H1 may contain for example information items about a second data rate at which the second part ZT of the data burst, which follows the first part ET, is intended to be transmitted during a time $T_{ZT}$. As a rule, the second part ZT is transmitted at a higher rate than the first part ET. In the exemplary embodiment, the second part ZT of the data burst is transmitted by a second modulation method based on a DQPSK modulation. As a result, the data burst can be transmitted with a higher data transmission rate overall. It is not necessary in this case to change the transmission frequency between the first and second parts, since the higher data rate in the second part is achieved by means of the higher significance of the modulation method chosen in the second part. However, it is also equally possible for a frequency change to be provided. No data are transmitted in the time duration $T_{SZI}$ of the guard time interval SZI. The guard time interval SZI serves for transient recovery of the local oscillators to the second transmission frequency and for increasing the bandwidth of the filters at the reception end for selection of the frequency channel.

Following the guard time interval SZI, the base station B may transmit a synchronization word or the second access code AC2, which serves for symbol synchronization with the symbols transmitted by the second modulation method. Transmission of such an access code AC2 is effected in an optional manner and is dependent on how the synchronization of the second part ZT of the data burst is carried out.

The changeover from the first modulation method to the second modulation method may be effected continuously during an existing radio link between the base station and a mobile station apart from the guard time intervals SZI to be taken into account. It may be provided that the changeover from the first to the second modulation method is performed in each burst.

Since the volume of data that is transmitted in the first part ET of the data burst is generally significantly lower than the volume of data of the second part ZT, an increased data transmission rate of the data burst can be achieved overall on account of the higher-valued symbols with which the second part ZT is transmitted.

Figure 2:
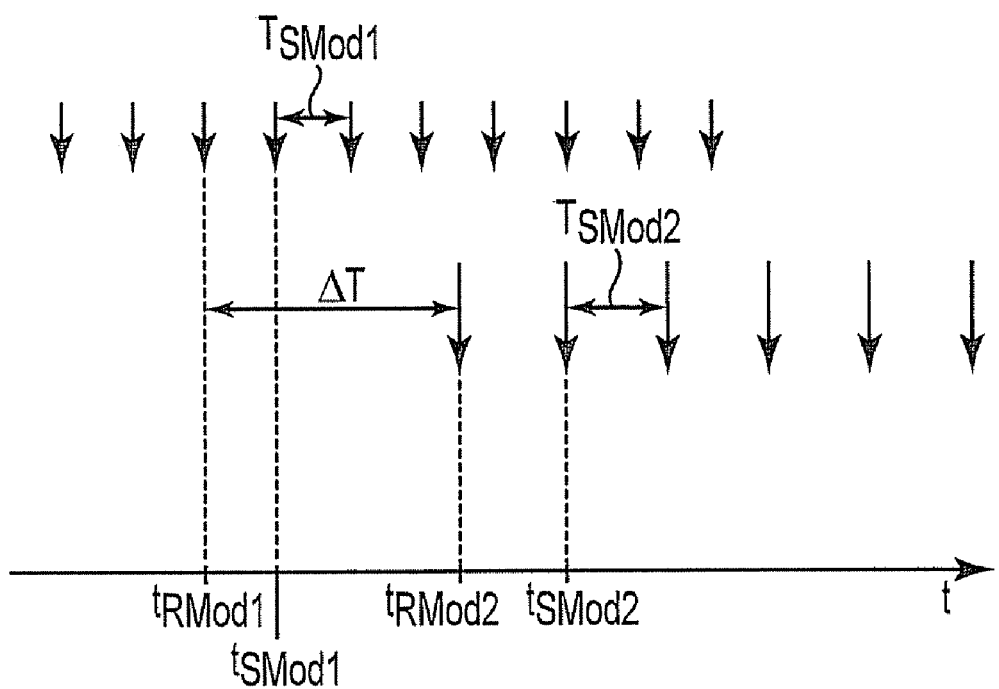
FIG. 2 shows an illustration of a first exemplary embodiment of the invention.

FIG. 2 shows an illustration of a first exemplary embodiment of an implementation according to the invention of the synchronization of the first part ET and the second part ZT of the data burst. The upper row of arrows arranged next to one another shows the detection instants (maximum energy) of the symbols of the first part ET that are transmitted by the first modulation method Mod1, for example GFSK. The symbols of the first part have a symbol duration $T_{SMod1}$. The second row of arrows arranged underneath characterizes the detection instants (maximum energy) of the symbols of the second part ZT of the data burst that are transmitted by the second modulation method Mod2, for example DQPSK. The symbol duration of the symbols of the second part ZT is $T_{SMod2}$ and in this case, by way of example, is greater than the symbol duration $T_{SMod1}$. However, it may also be provided that the symbol duration $T_{SMod1}$ and $T_{SMod2}$ are identical or $T_{SMod1}$ is greater than $T_{SMod2}$. In the exemplary embodiment, synchronization information items are determined during the acquisition of the signal on the basis of the synchronization word AC1 (e.g. by means of a correlation method). In this case, the symbol instants and the initial instants of the data transmission frames are determined as synchronization information items. A determined initial instant $t_{RMod1}$ of a data transmission frame is depicted by way of example in FIG. 2. Furthermore, the determined symbol instant $t_{SMod1}$ of a symbol of the first part ET is depicted by way of example. As a result, an optimum sampling instant is determined from the first part ET of the data burst. These instants $t_{RMod1}$ and $t_{SMod1}$ obtained from the first part ET as synchronization information items are used in order to be able to compensate for the changeover effects that occur in the event of the changeover to the second modulation method Mod2.

In this first exemplary embodiment, a fixedly prescribed temporal offset $\Delta T$, i.e. a fixed phase relationship, is provided between the symbol instants of the first part ET that occur in the receiver and the symbol instants of the second part ZT that occur in the receiver. This temporal offset $\Delta T$ results from the different signal propagation times in the reception signal path of the receiver in the event of the changeover between the different modulation methods. The fixedly prescribed temporal offset $\Delta T$ is added to the synchronization information items that have been determined from the first part ET of the data burst. As a result, the synchronization of the second part ZT of the data burst can be realized in a simple manner and the changeover effects, in particular propagation time changes, that occur in the event of the changeover can be compensated for rapidly without necessitating a reacquisition of the signal. The initial instant $t_{RMod2}$—required in the receiver—of the data transmission frames and the symbol instants $t_{SMod2}$ of the second part ZT transmitted by the second modulation method Mod2 can thereby be determined in a very simple manner.

In the case of the exemplary embodiment elucidated in FIG. 2, it is not necessary for the second part ZT to have a synchronization word or a second access code AC2, as is shown in FIG. 1. The time duration $T_{ZT}$ of the second part ZT of the data burst is reduced in this case to a time duration $T_{ZT'}$, which is reduced by the time duration of the access code AC2. The changeover of the filters in the signal-receiving radio station from the first modulation method Mod1 to the second modulation method Mod2 is carried out without a reacquisition in this case. A second access code AC2 is not required even when tracking is carried out for synchronization of the second part ZT of the data burst.

Figure 3:
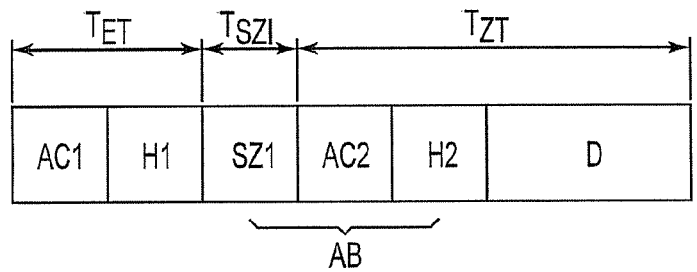
FIG. 3 shows an illustration of a second exemplary embodiment of the invention.

FIG. 3 illustrates a second exemplary embodiment, in which, in a departure from the first exemplary embodiment, a fixed temporal offset $\Delta T$ does not occur or is not known between the symbols that are to be detected in the mobile radio receiver and are modulated according to the first and second modulation method, respectively. The reference symbols in FIG. 3 are chosen analogously to the data burst illustration in FIG. 1 and designates parts of the data burst that correspond to one another in both figures. In this exemplary embodiment, as also in the first exemplary embodiment (FIG. 2), synchronization information is determined from the first part ET of the data burst in the form of the initial instants $t_{RMod1}$ of the data transmission frame and/or the symbol instant $t_{SMod1}$. In the exemplary embodiment in accordance with FIG. 3, these synchronization information items of the first part ET are used in order to be able to initialize the acquisition phase of the synchronization of the second part ZT at a favourable time. Since the approximate position of the second part ZT in the data burst, in particular the position of the second access code AC2 and of the second data burst header H2, is known, the time window or the region AB for reacquisition, (synchronization of the second part ZT) can be considerably decreased as a result of using the synchronization information items of the first part ET. The first part ET of the data burst may be completely disregarded. What is essential is that the second access code AC2 lies within this decreased time window considered or the acquisition region AB. As can be seen in FIG. 3, this partial region AB is relatively small in comparison with the total length of the data burst. As a result, the reacquisition (by means of a comparison of the received data with the sync word AC2 known in the receiver) can be effected in a more targeted manner and thus more favourably in terms of outlay and more rapidly. In the exemplary embodiment in FIG. 3, the acquisition region AB also extends into the regions of the guard time interval SZI and the second data burst header H2 that adjoin the access code AC2, since the temporal occurrence of the region of the second access code AC2 in the data burst is not known exactly. The less the acquisition region AB extends into the adjoining regions SZI and H2, the more rapidly the acquisition of the synchronization of the second part ZT can be carried out.

Figure 4:
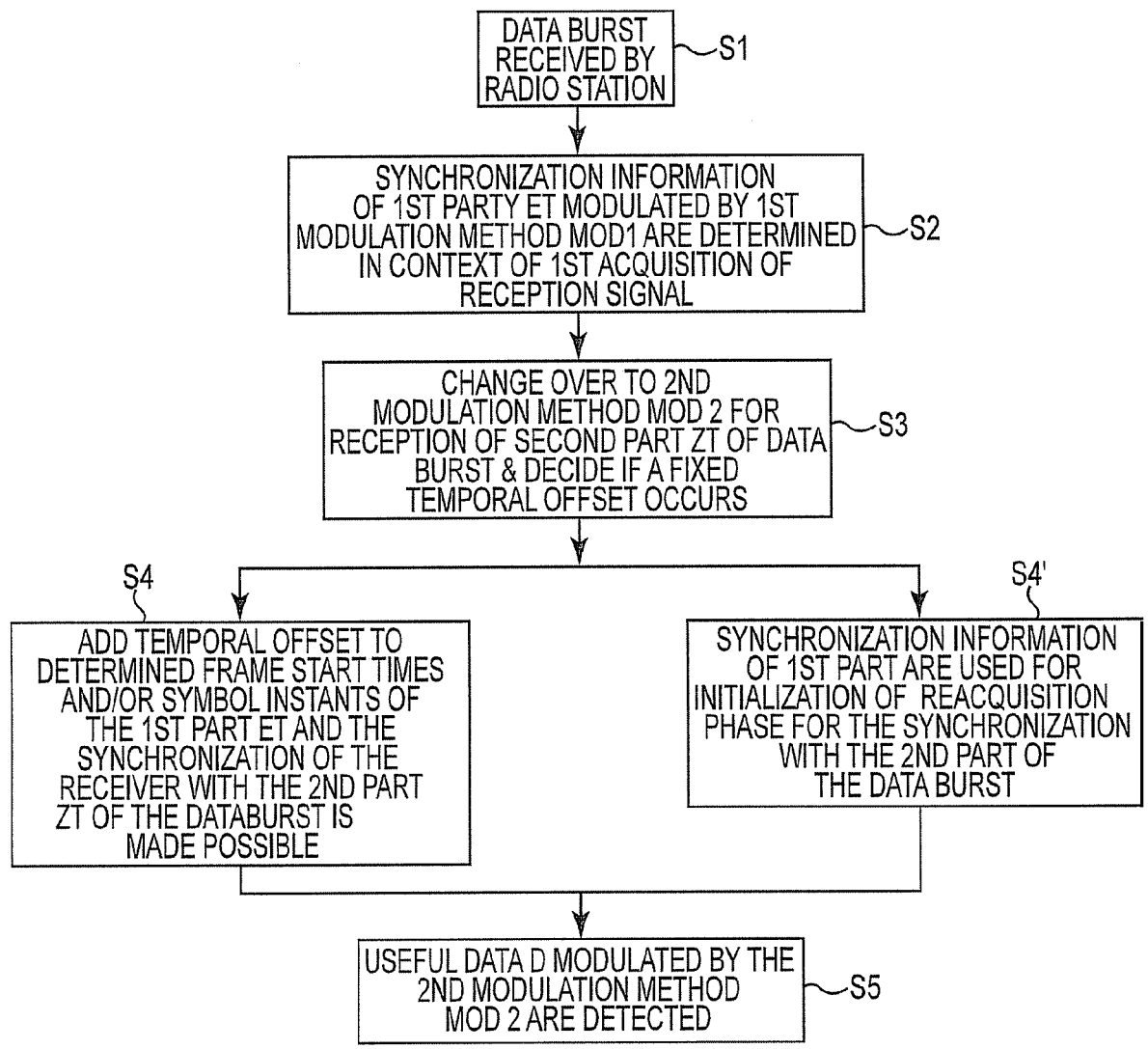
FIG. 4 shows a flowchart of the method according to the invention.

FIG. 4 schematically shows a flowchart of the method according to the invention. In step S1, the first part of the data burst is received by a radio station. In step S2, the synchronization information items of the first part ET modulated by the first modulation method Mod1 are determined in the context of the first acquisition of the reception signal. For the reception of the second part ZT of the data burst, in accordance with step 3, a changeover is made to the second modulation method Mod2. For rapid reacquisition and/or compensation of the effects that occur in the event of the changeover from the first to the second modulation method, it is then necessary to decide whether or not a fixed temporal offset occurs and is known in the reception path in the event of the changeover between the modulation method. If such a temporal offset is present, then in step S4 the temporal offset is added to the determined frame start times and/or symbol instants of the first part ET and the synchronization of the receiver with the second part ZT of the data burst is thereby made possible. If a fixed temporal offset is not known in the receiver, then in accordance with step S4' the synchronization information items of the first part are used for initialization of the reacquisition phase for the synchronization with the second part of the data burst, as a result of which only a relatively small region of the entire data burst has to be taken into account and, consequently the reacquisition (second synchronization) can be carried out significantly more rapidly. In step S5, the useful data D modulated by the second modulation method Mod2 are detected.

Figure 5:
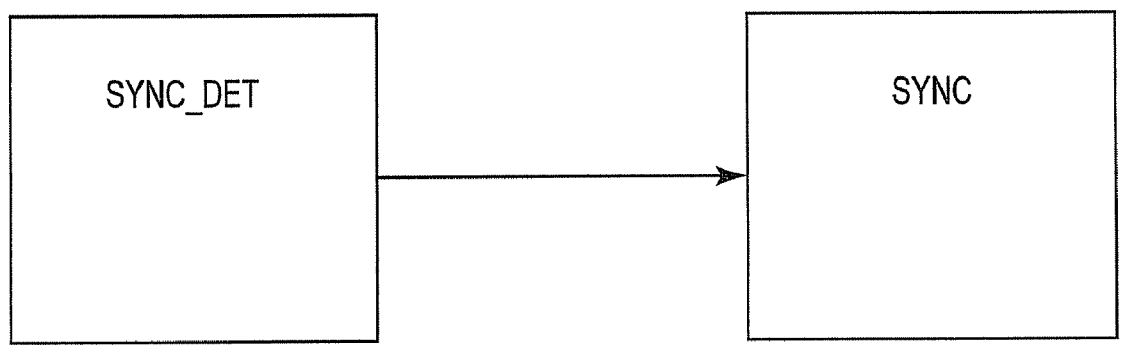
FIG. 5 illustrates one embodiment.

As illustrated in FIG. 5, a SYNC_DET unit determines synchronization information items from a first part of the data burst modulated by a first modulation method. A SYNC unit synchronizes the mobile radio receiver with a second part of the data burst modulated by a second modulation method using the synchronization information items determined by the SYNC_DET unit.

We claim:

1. A method for resynchronization of a mobile radio receiver in the event of a changeover between two different modulation methods by which data of a data burst transmitted from a base station to the mobile radio receiver are modulated, comprising:
    determining synchronization information items from a first part of the data burst modulated by a first modulation method; and
    synchronizing the mobile radio receiver with a second part of the data burst modulated by a second modulation method using the synchronization information items determined;
    wherein in the reception signal path of the mobile radio receiver, in the event of the changeover between the modulation methods, a fixed temporal offset, in particular a fixed phase relationship, is provided and the information items of the fixed temporal offset and the synchronization information items of the first part are used for synchronizing the second part of the data burst.

2. The method according to claim 1, wherein the first part of the data burst comprises information items of a first access code and, if appropriate, of a first data burst header, and the second part of the data burst comprises at least information items of a second data burst header.

3. The method according to claim 1, wherein the synchronization information items determined from the first part of the data burst contain symbol instants and/or an initial instant of a data transmission frame.

4. The method according to claim 1, wherein the synchronization information items of the first part of the data burst, in particular the symbol instant determined and/or the initial instant of the data transmission frame, are added to the fixed temporal offset.

5. The method according to claim 1, wherein the reception signal path of the mobile radio receiver, in the event of the changeover between the modulation methods, a fixed temporal offset, in particular a fixed phase relationship, is not provided and the synchronization information items determined from the first part of the data burst are used for initialization of a reacquisition phase for synchronization with the second part of the data burst.

6. The method according to claim 5, wherein in order to initialize the reacquisition phase for synchronizing the second part of the data burst, a partial region of the data burst is taken into account, in particular a partial region without the first part of the data burst which comprises a second access code of the second part of the data burst.

7. The method according to claim 1, wherein a GFSK modulation is carried out by the first modulation method and a DMPSK modulation, in particular a DQPSK modulation, is carried out by the second modulation method.

8. An arrangement for resynchronization of a mobile radio receiver in the event of a changeover between two different modulation methods by which data of a data burst transmitted from a base station to the mobile radio receiver are modulated comprising:
    means for determining synchronization information items from a first part of the data burst modulated by a first modulation method; and
    means for synchronizing the mobile radio receiver with a second part of the data burst modulated by a second modulation method, using the synchronization information items determined;
    wherein in the reception signal path of the mobile radio receiver, in the event of the changeover between the modulation methods, a fixed temporal offset, in particular a fixed phase relationship, is provided and the information items of the fixed temporal offset and the synchronization information items of the first part are used for synchronizing the second part of the data burst.

9. The arrangement according to claim 8, wherein the first part of the data burst comprises information items of a first access code and, if appropriate, of a first data burst header, and the second part of the data burst comprises at least information items of a second data burst header.

10. The arrangement according to claim 8, wherein the synchronization information items determined from the first part of the data burst contain symbol instants and/or an initial instant of a data transmission frame.

11. The arrangement according to claim 8, wherein the synchronization information items of the first part of the data burst, in particular the symbol instant determined and/or the initial instant of the data transmission frame, are added to the fixed temporal offset.

12. The arrangement according to claim 1, wherein in the reception signal path of the mobile radio receiver, in the event of the changeover between the modulation methods, a fixed temporal offset, in particular a fixed phase relationship, is not provided and the synchronization information items determined from the first part of the data burst are used for initialization of a reacquisition phase for synchronization with the second part of the data burst.

13. The arrangement according to claim 12, wherein in order to initialize the reacquisition phase for synchronizing the second part of the data burst, a partial region of the data burst is taken into account, in particular a partial region without the first part of the data burst which comprises a second access code of the second part of the data burst.

14. The arrangement according to claim 8, wherein a GFSK modulation is carried out by the first modulation method and a DMPSK modulation, in particular a DQPSK modulation, is carried out by the second modulation method.

15. A method for resynchronization of a mobile radio receiver in the event of a changeover between two different modulation methods by which data of a data burst transmitted from a base station to the mobile radio receiver are modulated, comprising:
   determining synchronization information items from a first part of the data burst modulated by a first modulation method, wherein the first part of the data burst comprises a first access code; and
   synchronizing the mobile radio receiver with a second part of the data burst modulated by a second modulation method, using the synchronization information items determined, wherein the second part of the data burst comprises a second access code.

16. An arrangement for resynchronization of a mobile radio receiver in the event of a changeover between two different modulation methods by which data of a data burst transmitted from a base station to the mobile radio receiver are modulated comprising:
   means for determining synchronization information items from a first part of the data burst modulated by a first modulation method, wherein the first part of the data burst comprises a first access code; and
   means for synchronizing the mobile radio receiver with a second part of the data burst modulated by a second modulation method, using the synchronization information items determined, wherein the second part of the data burst comprises a second access code.

* * * * *